(No Model.)
G. H. PERRY.
THILL COUPLING.
No. 465,726. Patented Dec. 22, 1891.
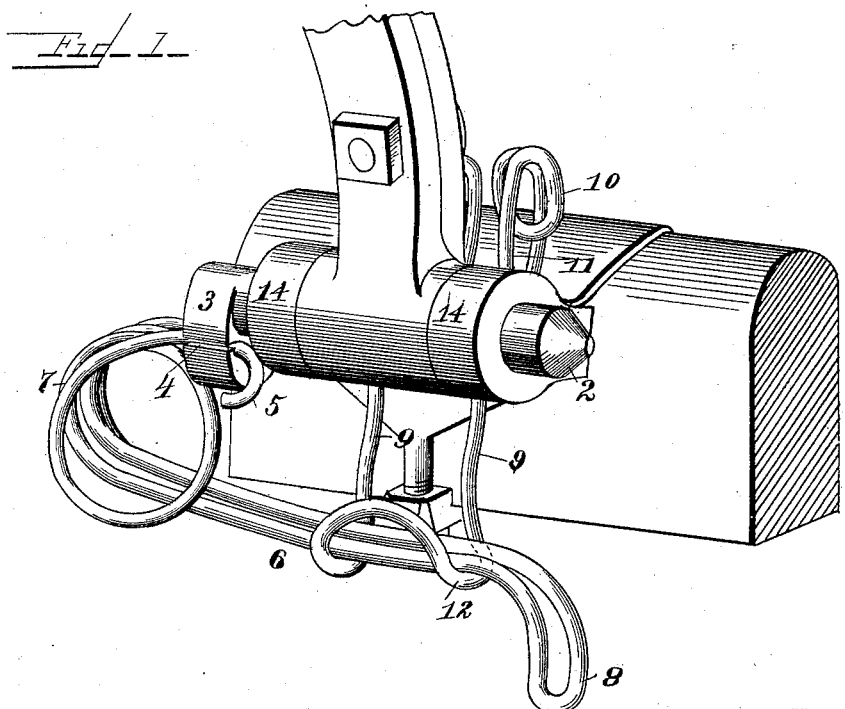
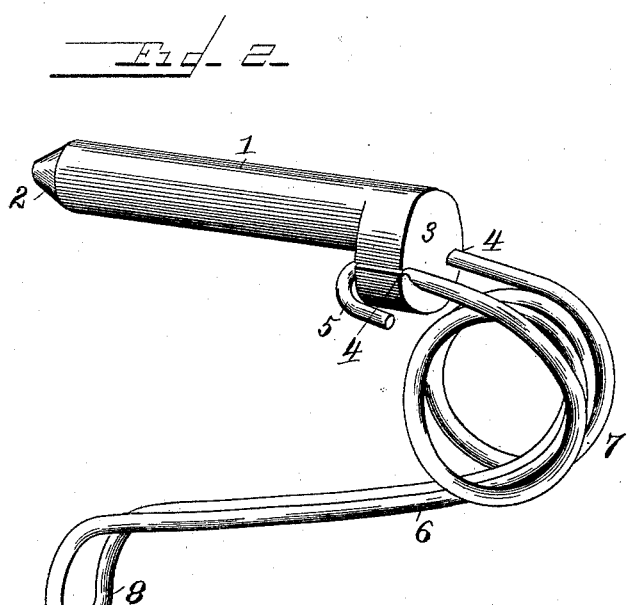
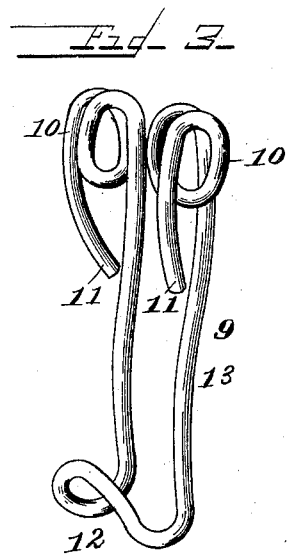
Witnesses
G. A. Tauberschmidt
James E. Lawrence
George H Perry Inventor
by
Harvey Spalding & Sons
his Attorneys

UNITED STATES PATENT OFFICE.

GEORGE H. PERRY, OF FRANKLIN, TENNESSEE.

THILL-COUPLING.

SPECIFICATION forming part of Letters Patent No. 465,726, dated December 22, 1891.

Application filed June 4, 1891. Serial No. 395,030. (No model.)

*To all whom it may concern:*

Be it known that I, GEORGE H. PERRY, a citizen of the United States, residing at Franklin, in the county of Williamson and State of Tennessee, have invented certain new and useful Improvements in Thill-Couplings and Anti-Rattling Devices, of which the following is a specification.

My invention relates to thill-couplings, and particularly to that class of couplings which serve to securely connect the thills to the vehicle, and also to prevent noise or rattling of the parts.

The objects of the invention are, first, to avoid the use of the usual nut for securing the coupling-bolt; second, to prevent loosening and rattling of the parts, and, third, to provide a simple, durable, and inexpensive coupling which may be readily adjusted to or removed from a vehicle by hand without the aid of tools of any kind.

With these ends in view the invention consists in the features of construction hereinafter fully described, and specified in the claims.

In the accompanying drawings, Figure 1 is a perspective view of parts of an axle and thill with my improvements applied thereto. Fig. 2 is a perspective view of the coupling-bolt and its spring, and Fig. 3 is a view in perspective of the anti-rattling spring detached.

The numeral 1 indicates the bolt rounded or pointed at one end 2, and formed at its opposite end with a circular head or disk 3, arranged eccentric to the bolt and formed at opposite sides with parallel slots 4, to receive the bent ends 5 of the securing-spring 6. This spring 6 consists of the coils 7, the bent ends 5, and a depending loop 8 bent downwardly, as shown, to interlock with the anti-rattling spring 9. The spring 9 consists of the coils 10, the ends 11, and a curved loop 12, which engages the spring 6, as shown in Fig. 1. The spring 9 is slightly curved at the point 13, to adapt it to closely fit upon the axle-clip, and the sides of the spring are a sufficient distance apart to allow the spring to rest between the ears 14 of the clip and to straddle the clip-nut, as shown. After the ends of the spring 6 are inserted into the slots of the bolt 1 the said ends are held in place by flattening the metal of the head 3 slightly to contract the slots and prevent the displacement of the spring; or, if desired, the bolt-head may be formed with holes or eyes to receive the ends of the spring, in lieu of open slots, in which instance the spring is secured by bending the ends. It will be apparent that the interlocking of the curved loops of the two springs serves to hold the bolt securely in place and also to retain the spring 9 in proper position. The two springs are thus made interdependent—each holding the other. The contraction and expansion of the spring 9 effectually prevent loosening of the parts, and hence prevent rattling.

Having fully described my invention, what I claim as new, and desire to secure by Letters Patent, is—

1. The combination, with the thill and axle-clip, of the bolt having a slotted head arranged eccentric to the bolt, a spring 6, secured to the bolt-head and formed with a depending curved end, and a spring 9, held in place between the thill and axle and provided with a curved end to engage the bolt-spring, substantially as set forth.

2. As an article of manufacture, a combined thill-coupling and anti-rattling device consisting of a bolt formed with a head having openings, as described, a spring 6 bent to form coils and a curved loop, and an anti-rattling spring bent to form coils, and a curved loop to interlock with the curved loop of the spring 6, substantially as set forth.

In witness whereof I hereunto set my hand in the presence of two witnesses.

GEORGE H. PERRY.

Witnesses:
JAMES L. MARSHALL,
JAMES D. PARK.